United States Patent [19]

Pittman

[11] 4,199,215

[45] Apr. 22, 1980

[54] TUBE SOCKET WITH NOVEL GROUNDING MEANS FOR HIGH VOLTAGE TERMINALS

[75] Inventor: Robert B. Pittman, River Edge, N.J.

[73] Assignee: Industrial Electronic Hardware Corp, New York, N.Y.

[21] Appl. No.: 942,414

[22] Filed: Sep. 14, 1978

[51] Int. Cl.[2] ........................ H01R 33/76; H01T 3/00; H02H 9/06

[52] U.S. Cl. ................................ 339/192 T; 313/325; 339/14 T; 339/143 T

[58] Field of Search ............................... 313/318, 325; 339/143 T, 144 T, 145 T, 111, 14 T, 191 M, 192 T, 210 T

[56] References Cited

U.S. PATENT DOCUMENTS

| | | | |
|---|---|---|---|
| 3,543,098 | 11/1970 | Simovits et al. | 339/111 X |
| 3,805,108 | 4/1974 | Suzuki | 313/318 |
| 3,865,452 | 2/1975 | Pittman | 339/14 T |

*Primary Examiner*—Roy Lake
*Assistant Examiner*—E. F. Desmond
*Attorney, Agent, or Firm*—James & Franklin

[57] ABSTRACT

The tube socket is especially adapted for use with a longitudinal extending cathode ray tube of the type having one or more high voltage pins and a plurality of relatively low voltage pins. The socket provides structure for spark gap grounding of the high voltage pin or pins, with or without spark gap grounding of the low voltage pins, the latter spark gap protection being essentially conventional. The structure is inexpensive and easy to mold and assemble as compared with prior art socket structures performing the same or equivalent functions.

47 Claims, 11 Drawing Figures

TUBE SOCKET WITH NOVEL GROUNDING MEANS FOR HIGH VOLTAGE TERMINALS

BACKGROUND OF THE INVENTION

The present invention relates to a cathode ray tube socket designed to be used in conjunction with a cathode ray tube having one or more high voltage terminals as well as a plurality of low voltage terminals, and more particularly to such a socket providing spark gap protection for the high voltage terminals, preferably together with separate spark gap protection for the low voltage terminals.

U.S. Pat. No. 3,865,452 describes a cathode ray tube socket having dual spark gap protection, i.e., having two separate and independent grounding capabilities such that the high voltage terminal has a high voltage grounding member, the low voltage terminals having a common low voltage grounding member, and a spark which has jumped from the high voltage terminal (normally operated at 25,000 volts D.C. or greater) to the high voltage grounding member cannot jump back to any of the low voltage terminals (normally operated in the range of a few thousand volts) and thus damage the tube. The socket therein described is especially adapted for use with cathode ray tubes having a plurality of low voltage pins and a single high voltage pin.

A recent development in the cathode ray tube field is a tube having not only a plurality of low voltage pins, but also a plurality of high voltage pins (i.e., pins normally operated at 10,000 volts or higher), generally two of the high voltage pins. A tube socket of the design specifically disclosed in U.S. Pat. No. 3,865,452 does not easily lend itself to adaptation for use with the new tubes for a number of reasons. As the length of the air gap required to provide spark gap protection is a positive function of the operating voltage of the terminal to be protected, two relatively large air gaps must be maintained in a single tube socket while maintaining the socket as small and compact as possible. Furthermore, means must be provided for isolating and expelling from the interior of the tube socket any ozone produced by sparking of one of the high voltage terminals before that ozone has an opportunity to ionize the air in the air gap associated with the other high voltage terminal and thus lead to premature firing of that other high voltage terminal. Finally, means must be provided to isolate and contain high voltage sparking as the use of a plurality of high voltage terminals introduces the possibility of sparking of one high voltage terminal affecting the other high voltage terminals, as well as increasing the possible danger to equipment in the area from the sparking of any one of the high voltage terminals.

As the new tube types are more sensitive than the old tubes, the new tubes, whether they employ one or a plurality of high voltage pins, are more likely to produce noise or static in the presence of a corona effect. Such a corona effect results from the use of a high voltage terminal having points or sharp edges and causes ionization of the air about the sharp edge or point, thus making the air more conductive and leading to a lower voltage breakdown point for all pins in the area of the ionized air. Where the new tubes employ a plurality of high voltage pins, the corona effect produced by one high voltage terminal is capable of affecting the other high voltage terminals in the area, and thus the avoidance of a corona effect is of even greater importance when the tube employs a plurality of high voltage pins.

It will be recognized by those skilled in the art that the isolation and expelling of ozone, the isolation and containment of high voltage sparking, and the minimization of corona effect are all desirable features of a tube socket, albeit in differing degrees, regardless of whether the socket affords dual spark gap protection, single spark gap protection, or even no spark gap protection.

In my pending application Ser. No. 823,616, filed Aug. 9, 1977 and entitled "Tube Socket With Dual Spark Gap Protection", assigned to the assignee of this application, I disclose a tube socket capable of accomplishing the features set forth above and specially designed for use with a cathode ray tube which not only carries two separate high voltage pins, but which houses those pins within silo structures for protective purposes. That socket, while it accomplished its desired results, was comparatively bulky, the shape of its molded insulating parts was quite complex, it was difficult to assemble, and hence it was costly to manufacture.

For example, the fact that the structure defining the chambers for the high voltage spark gaps was a part separate from the remainder of the socket structure, and which was in itself complex of shape and difficult and expensive to mold, contributed greatly to the overall cost and expense of the socket. In addition, in general the assembly of the terminals and spark gap elements with the insulating support portions of the socket presented production problems, particularly insofar as the high voltage terminals and the spark gaps associated therewith were concerned.

It is an object of the present invention to provide a tube socket for use with a cathode ray tube of the type having one or more high voltage pins as well as a plurality of low voltage pins, which socket is amenable to low cost manufacture without sacrifice of electrical properties.

Another object is to provide a tube socket which has a novel means for isolation and venting of ozone produced by sparking of a high voltage pin.

A further object is to provide a tube socket which minimizes the production of corona effect from a high voltage terminal.

Yet another object is to provide such a tube socket which can readily have incorporated thereinto means for spark gap protection for the low voltage terminals.

Still a further object is to provide such a tube socket for use with a tube having a plurality of high voltage pins, the tube socket minimizing the production of corona effect from any of the high voltage terminals.

It is also an object to provide such a tube socket of simplified construction which effectively isolates and contains sparking from any of the high voltage terminals, thereby to protect the other high voltage terminals as well as other equipment in the vicinity.

It is another object to provide a tube socket which is easily and inexpensively manufactured, yet sturdy and compact in design and functionally effective.

Yet another object is to provide any or all of the above features in a tube socket affording dual spark gap protection.

SUMMARY OF THE INVENTION

It has now been found that the above and related objections of the present invention are obtained by forming the socket basically of only three structural sub-assemblies, to wit, first and second supports adapted to be assembled together and in the main to receive between them most of the conductive electrical elements and to carry the terminals which are adapted to engage and make electrical connections with the pins carried by the cathode ray tube, one of those supports having structure defining a spark gap passage for the high voltage terminal, one end of which passage is exposed, the third structural part being mounted on the aforementioned structure and closing the exposed end of the high voltage spark gap passage. Preferably the first support carries the terminals adapted to engage and make electrical connection with the low voltage pins on the cathode ray tube, as well as the spark gap protection for those low voltage terminals when such spark gap protection is provided, and in addition comprises structure defining the high voltage spark gap passage. The second support preferably carries the terminals adapted to engage and make electrical connection with the high voltage pins of the cathode ray tube, and also preferably closes one end of the high voltage passage in the structure of the first support. Spark gap means are located in the high voltage spark gap passage and maintained in appropriate axially spaced relationship, one of those means preferably being carried by the second support and the other preferably being carried by a third structural member. That third structural member is adapted to be mounted on the spark gap passage structure and to cover and close the other end of the high voltage spark gap passage. The high voltage terminals and one of the means defining the spark gap for protection of the high voltage terminals may be integral with one another.

When the cathode ray tube carries a plurality of high voltage terminals they are usually maintained at different high potentials and therefor call for different magnitudes of spark gap protection. The socket of the present invention is particularly well adapted to accommodate and satisfy that requirement. The structure on the first support may be provided with separate spark gap passages of different axial lengths, the portions of the structure within which those passages respectively are formed having different lengths and the open tops of those passages thus being located at different positions relative to the height of the structure. The third or covering member which is mounted on that structure has stepped portions corresponding to the different lengths of the two structure passages and on those stepped portions carries the corresponding spark gap means for each of the passages respectively, thereby to produce the spark gap passages of different lengths appropriate to the different electrical requirements involved. The spark gap means for both of the passages may be integrally formed, and both may be assembled in a single operation to the covering member which carries them.

The low voltage terminals, and the spark gap protection for those terminals when provided, may be assembled to the first support, the high voltage terminals and one of the spark gap means associated therewith may be assembled to the second support, and the other spark gap means for the high voltage terminals may be assembled to the covering member. The places where those electrical parts are to be mounted on their respective supports are readily accessible, so that the assembly operations can be performed quickly and expeditiously, and, if desired, at least partially by means of automatic machinery. Three sub-assemblies are thus produced, to wit, the first support with the low voltage terminals and associated spark gap protection where provided, the second support with the high voltage terminals and one portion of the spark gap means associated therewith, and the covering member with the other portion of the high voltage spark gap means secured thereto. The first and second supports are of only moderate complexity, and hence may be molded comparatively readily and inexpensively. The covering member is of extremely simple construction—merely a flat plate, stepped when a plurality of different spark gaps are to be provided for different high voltage terminals respectively. The three sub-assemblies can be secured to one another in a most expeditious fashion, the resulting socket is as electrically and protectively efficient as its much more complex and expensive predecessors, yet it is sturdier, smaller and less costly than those predecessors.

To the accomplishment of the above, and to such other objects as may hereinafter appear, the present invention relates to the constructional features of a cathode ray tube socket as defined in the appended claims.

DETAILED DESCRIPTION OF THE PREFERRED EMBODIMENT

Generally speaking, the tube socket of the present invention is formed of three insulating structural elements, a first support generally designated A and including a structure generally designated A' within which the high voltage spark gap protection is provided, a second support generally designated B, and a covering member generally designated C. A plurality of low voltage terminals generally designated D are carried by the first support A and one or more high voltage terminals generally designated E are carried by the second support B. One or more passages F are formed in the structure A', those passages F being open at their upper ends, with a member C covering and closing those upper ends. The member C carries a first spark gap means generally designated G, with which is associated a connection means H which extends externally of the socket. The lower ends of the passages F are closed by the second support B, which carries second spark gap means generally designated I which are located in opposed relationship to the spark gap means G carried by the covering member C and which have connecting means generally designated J associated therewith which extends externally of the socket. The second spark gap means I are electrically connected to, and may be formed integrally with, the high voltage terminals E which are also mounted on the second support B. Usually a low voltage spark gap protecting means generally designated K is also provided, which as here shown is carried by the first support A.

Figure 1A:
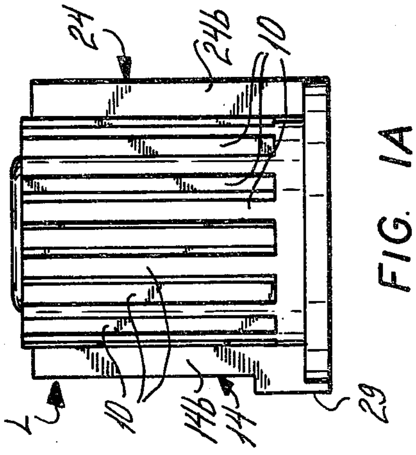
FIG. 1*a* is a side elevational view of the pin-carrying plug portion of the tube to be used therewith.
Figure 2A:
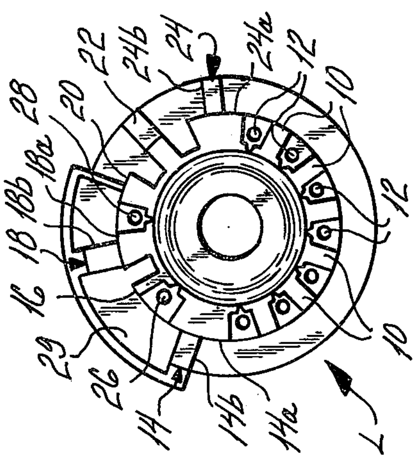
FIG. 2*a* is a bottom plan view of the associated tube plug.
Figure 1:
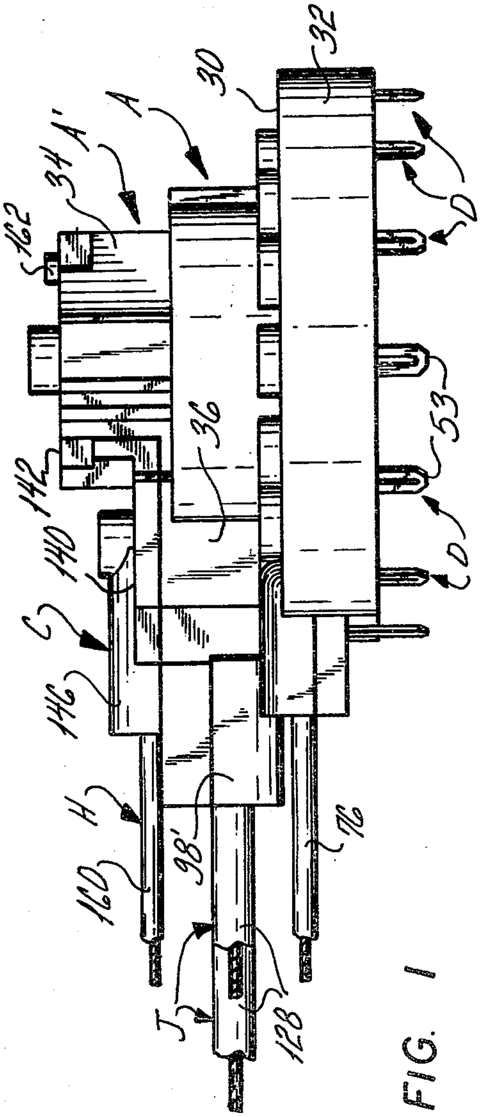
FIG. 1 is a side elevational view of a tube socket according to the present invention.

The constructural advantages and desired functioning of the socket must be considered in relation with the tube adapted to be used therewith. As is shown in FIGS. 1*a* and 2*a*, the tube end or plug portion generally designated L, which is adapted to be received by the socket of the present invention, has the general configuration of a longitudinally extending hollow cylinder carrying a plurality of circumferentially spaced longitudinally extending radial projections 10 between which the low voltage pins 12 of the tube extend. As here shown these pins are seven in number and are equally circumferentially spaced over about one-half of the circumference of the plug. Extending radially outwardly from the remainder of the circumference of the plug are partitions 14, 16, 18, 20, 22 and 24, the partition 14 having a wide radially inner portion 14*a* and a narrow radially outer portion 14*b*, the partition 16 being circumferentially narrow and radially short, the partition 18 having a radially inner relatively wide portion 18*a* and a radially narrow outer portion 18*b*, the partition 20 being radially short, the partition 22 being radially long, and the partition 24 having a radially inner wide portion 24*a* and a radially outer narrow portion 24*b*. The high voltage pins 26 and 28 are received between the partitions 14 and 16 and the partitions 18 and 20 respectively. The portion 29 of the plug L axially adjacent to the projections and exposed pins flanges radially outwardly so as to act as a stop limit for insertion of the plug L into the socket.

Figure 2:
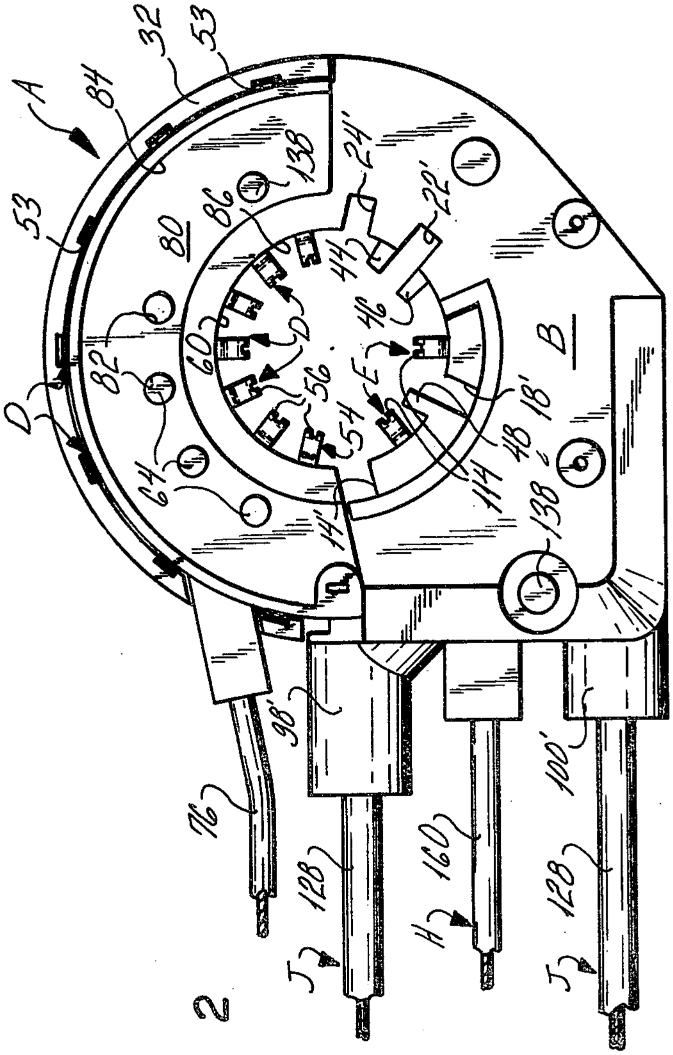
FIG. 2 is a bottom plan view of the socket.
Figure 3:
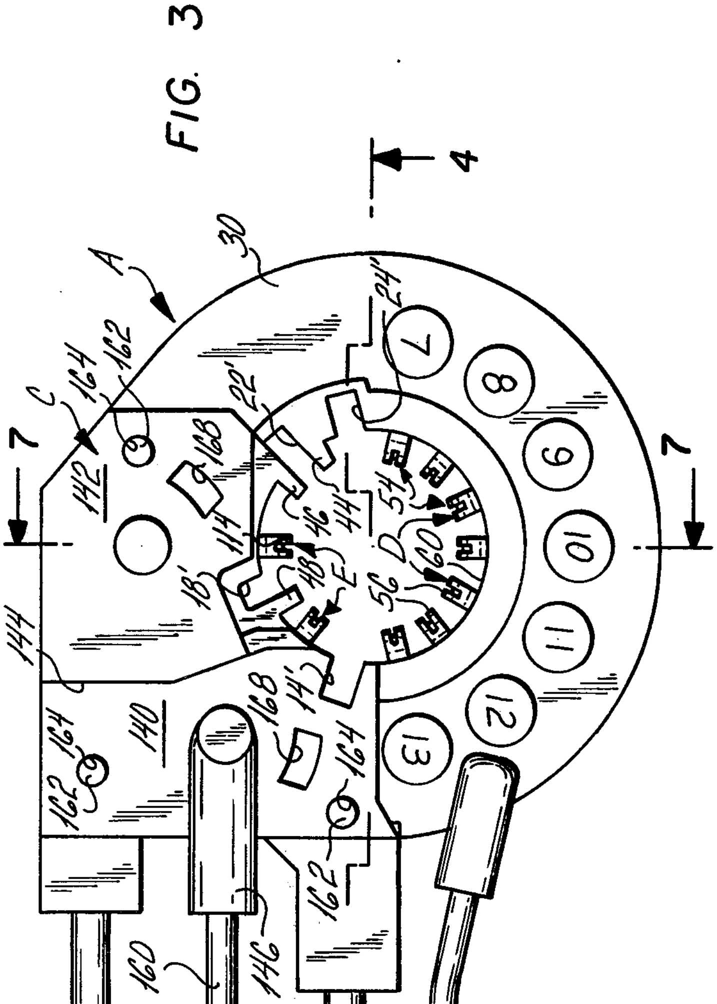
FIG. 3 is a top plan view of the socket.
Figure 4:
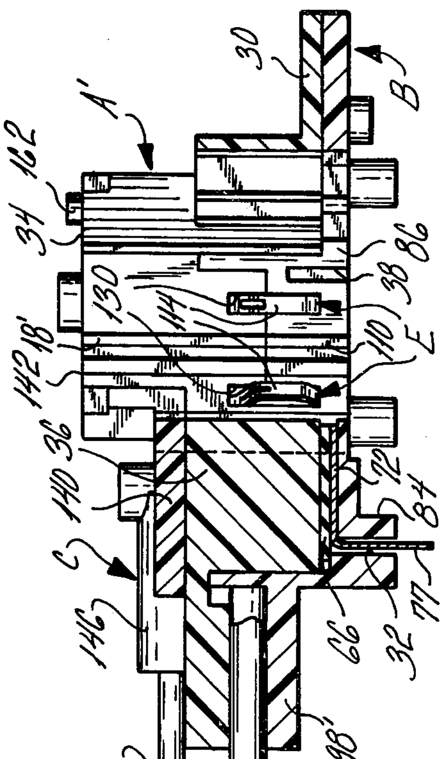
FIG. 4 is a side elevational view thereof, partially in cross-section taken along the line 4—4 of FIG. 3.
Figure 5:
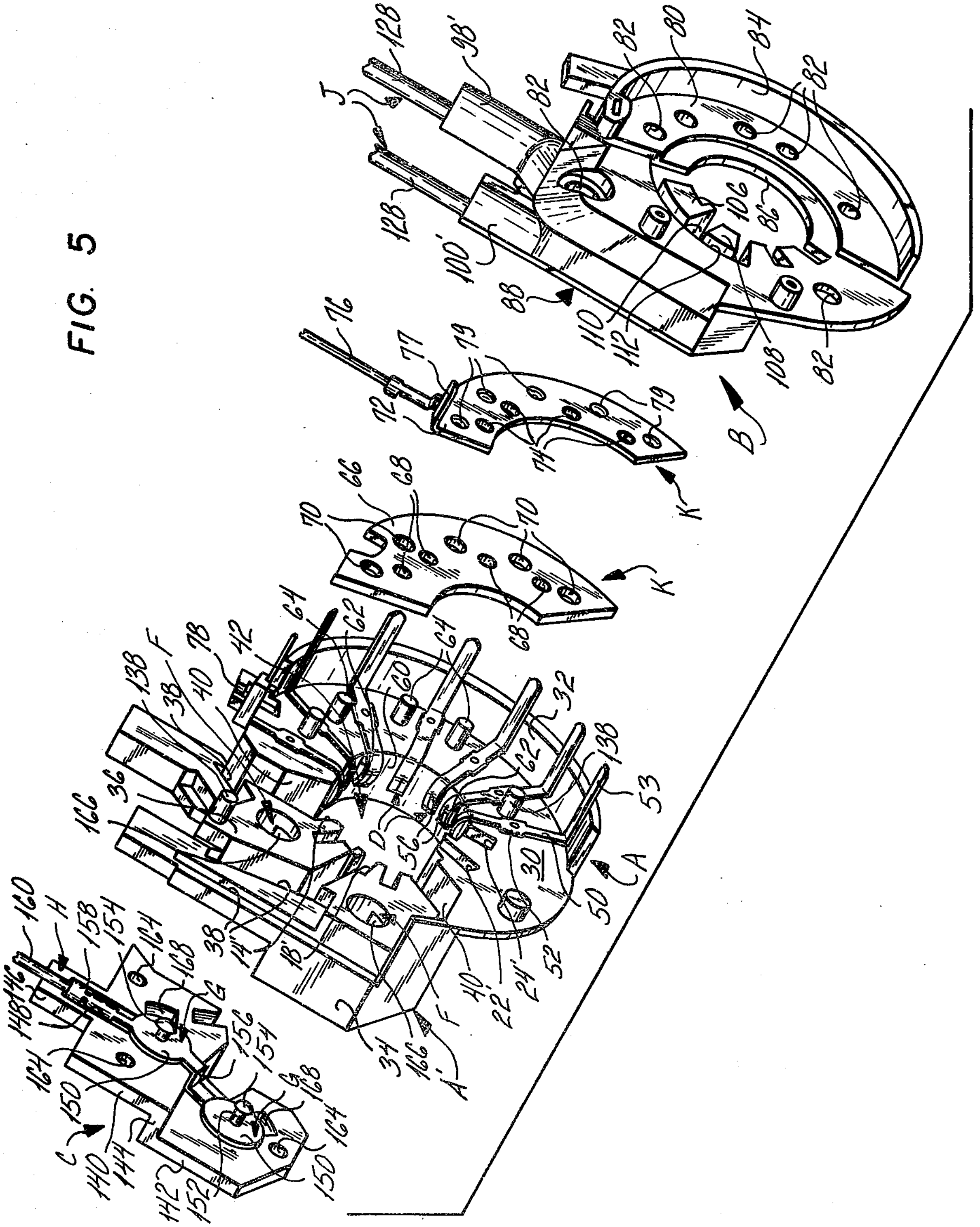
FIG. 5 is an exploded isometric view of the socket.
Figure 6:
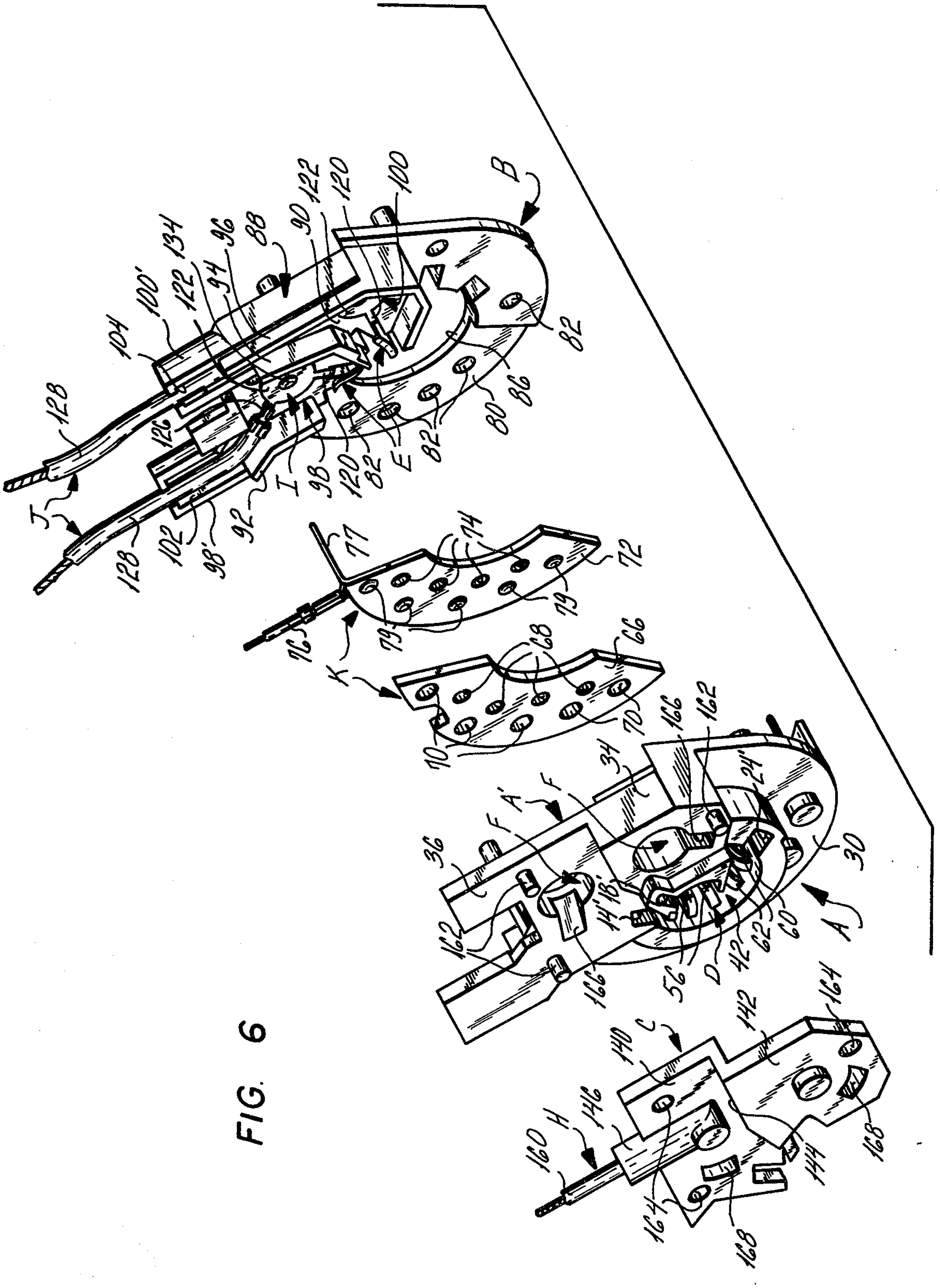
FIG. 6 is an exploded isometric view thereof, taken from a different angle than FIG. 5.

Turning now to the socket itself, the first support A is preferably molded in one piece from a suitable insulating material. It comprises a plate portion 30 having a flange 32 which extends partway around the circumference of the support A, and, at another circumferential portion thereof, comprises the structure A' for forming the high voltage spark gap passages F. In the form here specifically disclosed the cathode ray tube is provided with two different high voltage terminals 26 and 28 which are normally maintained at different relatively high voltages, and consequently the electrical specifications for spark gap protection for the high voltage terminals E associated with those high voltage pins 26 and 28 respectively will differ. Accordingly, in the construction here specifically disclosed the structure A' is provided with a relatively thick portion 34 and a relatively thin portion 36, each having a passage F extending completely therethrough. Because of the difference in the thicknesses of the structure portions 34 and 36, the passage F in the structure portion 34 will be considerably longer than the passage F in the structure portion 36. As may best be seen in FIG. 5, relatively deep grooves 38 formed in the lower surface of the structure A' between and around the lower parts of the structure portions 34 and 36 respectively for electrical isolation purposes and to reduce corona. The bottom surfaces of the portions 34 and 36 may be essentially coplanar, but located at a plane somewhat above the plane of the portion 30, thus producing steps 40 in the lower portion of the first support A. The center of the first support A is apertured, at 42, in order to permit the plug L to enter thereinto, and a series of radial grooves 14', 18', 22' and 24' are formed therein (see FIG. 2), along with axially extending radial projections 44, 46, 48 (see FIG. 2). The grooves 14', 18', 22' and 24' are designed to mate with the plug L by receiving the partition portions 14*b*, 18*b*, 22 and 24*b* respectively of the plug L when the plug is inserted into the socket, the projection 44 then being received in the groove between the plug partitions 22 and 24*a*, the projection 46 being received between the plug partitions 22 and 20, and the projection 48 being received between the plug partitions 16 and 18*a*.

Figure 9:
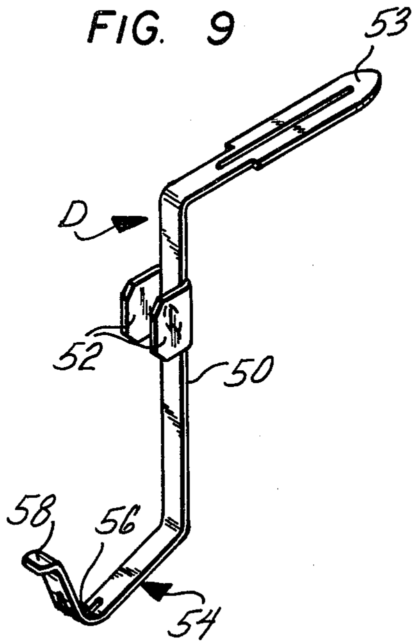
FIG. 9 is an osometric view of a low voltage terminal.
Figure 7:
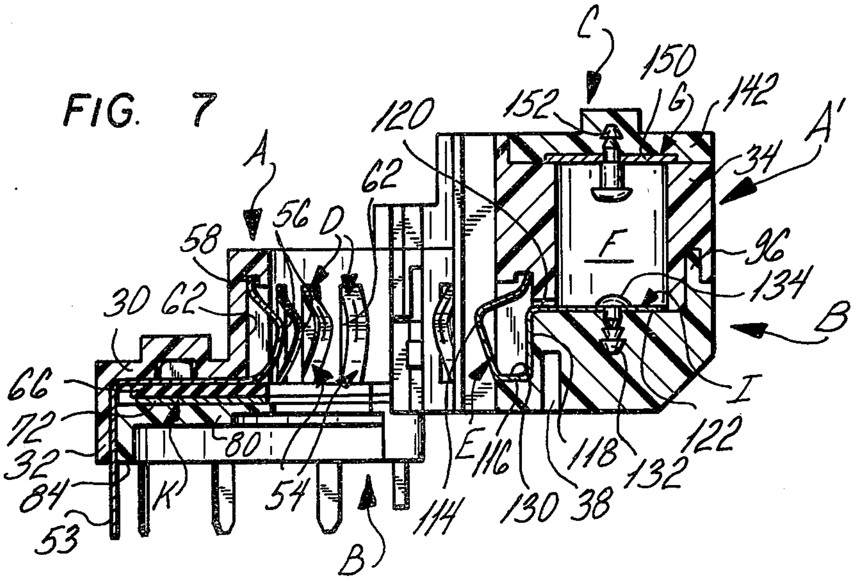
FIG. 7 is a cross-sectional view of the socket taken along the line 7—7 of FIG. 3.

A typical low voltage terminal D is illustrated in FIG. 9. It is formed of an appropriate conductive material and comprises a main body 50 from which ears 52 extend, a downwardly bent tail portion 53, and an upwardly bent contact portion 54 which, as disclosed may be arcuate or bent at 56 and terminates in a tip 58. The terminals D are mounted on the plate portion 30 of the first support A, with their bodies 50 resting on the plate portion 30, their ears 52 snugly received in recesses formed in the surface of the portion 30, their tails 52 extending along the inner surface of the flange 32 and projecting out therebeyond to facilitate the making of external electrical connection thereto, and their contacting portions 54 extending along the circumferential surface 60 defining the aperture 42, that surface preferably being provided with grooves 62 for circumferentially locating the contact portions 54 and receiving the tips 58 thereof.

A series of posts 64 extend down from the portion 30 of the support A, and an insulating strip 66 is provided with apertures 68 through which those posts 64 are adapted to extend. The insulating strip 66, when in position resting on at least some of the terminal bodies 50, will thus extend over those bodies 50. Apertures 70 are provided in the strip 66 adapted to register with the terminal bodies 50 respectively.

A metallic conductive grounding strip 72 is seated on top of the insulating strip 66, located in position by means of apertures 74 formed therein through which the posts 64 extend, the strip 72 having a lead 76 extending out therefrom, that lead passing through a slot 78 formed in the undersurface of the support A. A tab 77 may be struck up from the strip 72. The apertures 70 through the insulating strip 66, together with the low voltage terminal body portions 50 and the conductive strip 72, which oppose one another at the ends of those apertures 70, define spark gaps for protecting the low voltage terminals D. If desired, the length of those spark gaps, nominally set by the thickness of the strip 66, can be shortened by forming protrusions 79 on the conductive strip 72 which extend partway through the apertures 70. The lead 76 connected to the conductive strip 72 is adapted to be connected to some external reference source such as ground. In this way spark gap protection for the low voltage terminals D is provided, in what is essentially a known fashion, and that low voltage terminal spark gap protection in and of itself forms no part of the instant invention.

The parts adapted to be associated with and carried by the first support A (the low voltage terminals D and the low voltage spark gap protective means, the insulating strip 66 and the conductive strip 72 together with its grounding lead 76) can be assembled thereto in a simple and facile manner, and from the upper face thereof (the face visible in FIG. 5) simply by sliding the low voltage terminals D into place, positioning the insulating strip 66 on the posts 64, and then positioning the conductive strip 72 on the posts 64. When this has been done the subassembly comprising the first support A and the parts carried thereby comprise the entire system for receiving and making electrical connection with the low voltage pins 12 of the cathode ray tube plug L.

The second support B is, like the first support A, designed to be molded from a suitable insulating material, and is so shaped as to present only minimal problems in effecting such molding. It comprises a plate portion 80 of essentially the same configuration as the plate portion 30 of the first support A, the portion 80 being provided with openings 82 adapted to receive the posts 64 extending up from the portion 30 of the first support A. A flange 84 extends downwardly from the portion 80 and is adapted to be slidably received inside the flange 32 of the first support A, with the tabs 53 of the low voltage terminals D received therebetween, thereby to provide radial support for those tabs.

The second support B is provided with a central aperture 86 corresponding and registering with the central aperture 42 of the first support A. That portion of the second support B adapted to register generally with the structure A' on the first support A is provided with a housing structure generally designated 88 defined by an upwardly facing bottom wall 90 and upwardly extending partitions 92, 94 and 96 defining chambers 98 and 100 respectively adapted, when the supports A and B are assembled, to register with the lower ends of the passages F in the structure A' respectively, the partitions 92, 94 and 96 further defining openings 102 and 104 from the chambers 98 and 100 respectively. The chambers 98 and 100 are each open to the central aperture 86, and there the support B defines radial projections 106 and 108 separated from one another by groove 110 and partially separated from the remainder of the support B by vertical groove 112. Portions of the partitions 92, 94 and 96 are snugly received in the grooves 38 in the lower surface of the structure A' when the first and second supports A and B are assembled.

The chambers 98 and 100 and the radial projections 106 and 108 are designed to receive the high voltage terminals E and the second spark gap means I and the means J designed to make electrical connection thereto. In the embodiment here specifically illustrated there are two high voltage terminals E, each with its separate associated spark gap means I and connection means J. One advantage of the construction of the present invention is that each high voltage terminal E can be formed integrally with its associated spark gap means I and at least a portion of the associated connection means J, and that all of those parts can then be assembled as a unit with the second support B in a facile and rapid manner capable of being carried out by automatic assembly machinery.

Figure 8:
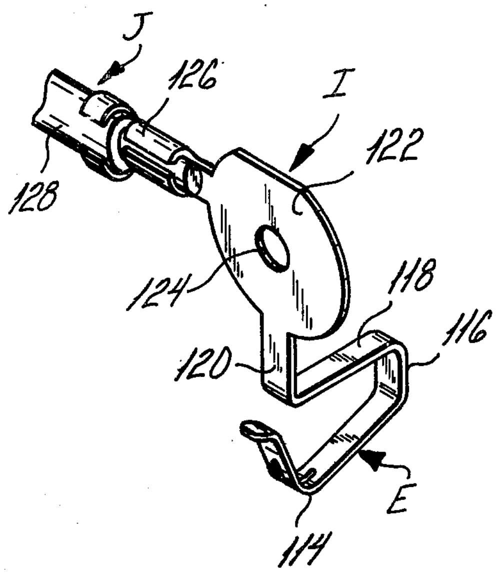
FIG. 8 is an isometric view of an integral high voltage terminal and spark gap means.

FIG. 8 illustrates the combined high voltage terminal E and spark gap means I, together with a portion of its connection means J, adapted to be received in the chamber 98. The high voltage means terminal E comprises a resilient curved pin engaging portion 114, a lower horizontal portion 116, a vertical portion 118, and an upper horizontal portion 120. Formed integrally with the upper horizontal portion 120 is the spark gap means I, in the form of a conductive plate 122 with a central opening 124, and extending laterally from that plate 122 is a portion of the connection means J in the form of a terminal 126 adapted to be crimped around a lead 128. The combined high voltage terminal E, spark gap means I and connection means J designed to be received in the chamber 100 is essentially the same as that disclosed in FIG. 8, but with a specifically different configuration in order to correspond to the configuration of the chamber 100. Each of the units of the type shown in FIG. 8 are crimped to their respective leads 128 and are then placed in the chambers 98 and 100 respectively with the plates 122 and horizontally extending portions 120 resting on the bottom walls of those chambers and with the portions 118 and 116 extending into grooves 130 formed in the projections 106 and 108, with the lengths 118 and 116 engaging the radially outer and lower walls respectively of those grooves and with the curved contact portions 114 extending into the central opening 86. The plate 122 rests on the bottom wall of the chamber 98 or 100 as the case may be with its opening 124 in registration with a corresponding opening 132 formed in the relatively thick bottom wall of the support B, and the entire unit is held in place by driving a nail or bolt 134 through the plate opening 124 and into the bottom wall of the support. The leads 128 extend out to the exterior of the support B through the openings 102 and 104, which are formed at the ends of laterally projecting chamber portions 98' and 100' respectively, those openings being open at the top so as to facilitate assembly of the parts.

The portion 88 of the support B is designed to be received within the space defined in part by the step 40 on the support A, while at the same time the portion 80 of the support B is received over the conductive strip 72 and inside the flange 32 of the support A. Locating and positioning of the support B on the support A is accomplished by providing the support B with openings 82 through which the posts 64, as well as posts 138, on support A are adapted to pass. When the supports A and B are thus assembled, the portion 88 of support B closes the lower ends of the passages F in the support A and the spark gap means I are located in registration with those passages respectively at the bottoms thereof. The rounded head of the nail or bolt 134 which secured the plates 122 in place on the support B forms a part of the spark gap means I, and is of a character such as to minimize corona effect.

Once the sub-assemblies defined by the first and second supports A and B and the parts which they carry have been assembled, the socket is capable of making electrical connection with the low voltage pins 12 and the high voltage pins 26 and 28 of the cathode ray tube plug L which may be inserted into the socket and for conveying external signals to those pins, those external signals being conveyed to the low voltage terminals D via the exposed downwardly extending tails 53 of each of the low voltage terminals D and via the leads 128 separately associated with each of the high voltage terminals E. In addition, in the embodiment here specifically disclosed, spark gap protection for the low voltage terminals is provided by the conductive plate 72 and its associates lead 76 and/or the exposed downwardly extending tip of the tab 77.

All that remains to be finished, insofar as the overall structure of the socket is concerned, is the spark gap protection for the high voltage terminals E, here shown as two in number, each adapted to be subjected to a specifically different high voltage, and therefore each calling for a different effective length for the protective spark gap associated therewith, the terminal E adapted to be subjected to the higher voltage requiring a longer spark gap than the terminal E adapted to be subjected to the lower voltage. Also, because of the magnitude of the voltages to which the terminals E are adapted to be subjected, the spark gaps for each must be of appreciable length, must be effectively isolated from one another as well as from the low voltage terminals D, ozone produced by sparking must be isolated and expelled in an efficient fashion, and the occurrence of corona effect must be minimized to as great a degree as possible.

The high voltage spark gap protection for each of the high voltage terminals E is essentially, but not completely, defined by the structure produced when the supports A and B are assembled—each of the individual high voltage terminals E is electrically connected to a spark gap means I located at the bottom of its associated passage F formed in the structure A' which is a part of the first support A, that spark gap means I—the plate 122, together with its securing nail or bolt 134—being carried by the second support B which essentially closes the bottom of each passage F. In the form specifically disclosed the structure A' is so configured that the passages F are of different axial lengths, the passage F having the longer axial length preferably being associated with that high voltage terminal E which is adapted to be subjected to the higher of the two high voltages.

The spark gap protection structure for the high voltage terminals E is completed by the cover member C, molded from a suitable insulating material. Structurally the cover member C is exceedingly simple, and therefore easy and inexpensive to mold, since it essentially consists of a plate-like structure which, in the embodiment here disclosed, is formed of two stepped portions, a lower portion 140 and an upper portion 142 connected by a stepping portion 144, the portion 140 having a laterally extending part 146 provided on its undersurface with a groove 148. The member C is otherwise so shaped as to be fittingly received on the upper surface of the structure A', the lower plate-like portion 140 essentially closing the upper end of the shorter passage F and the upper plate-like portion 142 essentially closing the upper end of the longer passage F. Secured to the lower surface of the member C are a pair of spark gap means G together with an associated connection means H, each of those spark gap means G comprising a plate 150 having a central aperture 152, each plate 150 being secured to the member C by means of a headed nail or bolt 154, essentially in the same fashion as the plates 122 of the spark gap means I are secured to the second support B. However, the nails or bolts 154 may, if electrically appropriate, differ from the nails or bolts 134 in that they are designed to project downwardly from the plates 150 with which they are associated, the degree of that downward projection being determined by the length of protective air gap desired in each given instance. It is preferred, and it is there specifically disclosed, that the two spark gap means G for the two passages F be formed integrally with one another as part of a single metal stamping, and to that end they are physically connected by an integral strip 156 of the material of which they are formed, that strip 156 being configured so as to conform to the step in the member C. Also integral with one of the plates 150 is a terminal portion 158 adapted to receive and be crimped to an outwardly extending lead 160.

The member C is positioned on and secured to the top of the structure A' by means of pins 162 extending up from the structure A' and adapted to be received in openings 164 in the member C.

When the member C has been placed in position, the spark gap means G carried thereby will be located in registration with the respective passages F and the spark gap means I located at the bottom of those passages F, the tops of the passages F will be essentially closed, and the spacing between the rounded heads of the elements 134 and 154 in each passage will define the effective spark gap length for that passage, the rounded nature of those heads facilitating the attainment of the desired spark gap functional characteristics, and in particular minimizing corona effect.

When a spark occurs ozone is formed. Unless that ozone is permitted to escape from the passage F it may cause undesired electrical effects, such as the spreading of the spark to other portions of the socket. In order to facilitate such ozone escape, each of the passages F is provided on its inner surface with a groove 166 and the upper end of that groove is adapted to register with an opening 168 formed in the member C, thus providing a path from the interior of the passage F to the exterior of the socket through which ozone, if it is formed, can escape.

As will be apparent from the preceding description, the socket of the present invention utilizes a minimal number of parts none of which are particularly complex or difficult to manufacture and many of which are exceedingly simple and inexpensive to manufacture. For example, all of the conductive parts may be made of simple metal stampings, and many of those parts are formed integrally with one another to facilitate assembly and insure reliable electrical interconnection. The structural insulating parts are readily moldable, and their structures are such as to be sturdy, efficient in the use of material, and easy to manufacture and to handle. The socket is assembled by forming but three sub-assemblies—the first and second supports A and B and the cover member C with their associated conductive parts, and those three sub-assemblies are then assembled to one another in a simple manner. All of the conductive parts are assembled with their respective insulating supporting parts by being mounted on completely exposed supporting surfaces, thereby requiring in essence only a rectilinear movement into final position, and the three sub-assemblies are assembled with one another in a comparable fashion, so that all of the assembly operations are facile, reliable, and amenable to mass production by automatic equipment. At the same time the socket thus produced is electrically quite sophisticated, providing spark gap protection for the low voltage terminals D in relatively conventional fashion and providing exceptionally effective spark gap protection for one or more high voltage terminals E, with the spark gap protection for the different high voltage terminals E being readily tailored to the particular voltages to which those terminals may be subjected and used.

While but a single embodiment of the present invention has been here specifically disclosed, it will be apparent that many variations may be made therein, all within the scope of the instant invention as defined in the appended claims.

I claim:

1. A tube socket for use with a cathode ray tube of the type having a high voltage pin and a plurality of relatively low voltage pins, said socket comprising:

A. a first support having an area receiving a plurality of first terminals and a structure having a passage therethrough at least partially open at both ends;

B. a plurality of first terminals, adapted to make electrical connection to said low voltage pins, received on said first support at said area;

C. a member mounted on said structure and at least partially closing one end of said passage;

D. a first high voltage spark gap means located adjacent said one end of and exposed to the interior of said passage and connecting means electrically connected to said first high voltage spark gap means and extending to a point external of said structure;

E. a second support assembled with said first support and having a part registering with and at least partially closing the other end of said passage;

F. a low voltage spark gap means comprising a ground ring and associated connecting means extending to a point external of said structure, and means comprising at least one of said member and said second support for mounting said ground ring in a position overlying and spaced from portions of said first terminals, G. a second high voltage spark gap means located adjacent said other end of and exposed to the interior of said passage and spaced from said first high voltage spark gap means, and connecting means electrically connected to said second high voltage spark gap means and extending to a point external of said second support;

H. a second terminal, adapted to make electrical connection to said high voltage pin, mounted on said socket; and I. means electrically connecting said second terminal and said second high voltage spark gap means.

2. The tube socket of claim 1, in which said structure extends vertically from said first support, said member at least partially closes that end of said passage directed away from said second support, and said second support closes the other end of said passage.

3. The tube socket of claim 2, in which said first high voltage spark gap means is mounted on said member.

4. The tube socket of claim 3, in which said second high voltage spark gap means is mounted on said second support.

5. The tube socket of claim 4, in which said second terminal is mounted on said second support.

6. The tube socket of claim 5, in which said second high voltage spark gap means and said second terminal are integral with one another.

7. The tube socket of claim 5, in which said structure has a plurality of passages of different axial lengths, each with its own set of high voltage spark gap means, said member at least partially closing one end of each of said passage and said second support part at least partially closing the other end of each of said passages, in which said one ends of said passages terminate at differently axially located points, and in which said member is stepped, whereby separate stepped parts thereof at least partially close said one ends of said passages respectively.

8. The tube socket of claim 7, in which the first high voltage spark gap means for each of said passages respectively are mounted on different stepped portions of said member.

9. The tube socket of claim 8, in which said first high voltage spark gap means for each of said passages respectively are integral with each other.

10. The tube socket of claim 7, in which said first high voltage spark gap means for each of said passages respectively are integral with each other.

11. The tube socket of claim 1, in which said first high voltage spark gap means is mounted on said member.

12. The tube socket of claim 11, in which said second high voltage spark gap means is mounted on said second support.

13. The tube socket of claim 12, in which said second terminal is mounted on said second support.

14. The tube socket of claim 13, in which said second high voltage spark gap means and said second terminal are integral with one another.

15. The tube socket of claim 13, in which said structure has a plurality of passages of different axial lengths, each with its own set of high voltage spark gap means, said member at least partially closing one end of each of said passage and said second support part at least partially closing the other end of each of said passages, in which said one ends of said passages terminate at differently axially located points, and in which said member is stepped, whereby separate stepped parts thereof at least partially close said one ends of said passages respectively.

16. The tube socket of claim 15, in which the first high voltage spark gap means for each of said passages respectively are mounted on different stepped portions of said member.

17. The tube socket of claim 16, in which said first high voltage spark gap means for each of said passages respectively are integral with each other.

18. The tube socket of claim 15, in which said first high voltage spark gap means for each of said passages respectively are integral with each other.

19. The tube socket of claim 1, in which said second high voltage spark gap means is mounted on said second support.

20. The tube socket of claim 19, in which said second terminal is mounted on said second support.

21. The tube socket of claim 20, in which said second high voltage spark gap means and said second terminal are integral with one another.

22. The tube socket of claim 1, in which said second terminal is mounted on said second support.

23. The tube socket of claim 22, in which said second high voltage spark gap means and said second terminal are integral with one another.

24. The tube socket of claim 1, in which said structure has a plurality of passages of different axial lengths, each with its own set of high voltage spark gap means, said member at least partially closing one end of each of said passage and said second support part at least partially closing the other end of each of said passages, in which said one ends of said passages terminate at differently axially located points, and in which said member is stepped, whereby separate stepped parts thereof at least partially close said one ends of said passages respectively.

25. The tube socket of claim 24, in which the first high voltage spark gap means for each of said passages respectively are mounted on different stepped portions of said member.

26. The tube socket of claim 25, in which said first high voltage spark gap means for each of said passages respectively are integral with each other.

27. The tube socket of claim 24, in which the first high voltage spark gap means for each of said passages respectively are mounted on different stepped portions of said member.

28. The tube socket of claim 1 in which said passage has a radial passage extension open at an end of said passage, and one of said member and said second support part having an aperture registering with said radial passage extension.

29. The tube socket of claim 28, in which said radial passage extension is open at said one end of said passage and said member is provided with said aperture.

30. The tube socket of claim 2 in which said passage has a radial passage extension open at an end of said passage, and one of said member and second support part having an aperture registering with said radial passage extension.

31. The tube socket of claim 30, in which said radial passage extension is open at said one end of said passage and said member is provided with said aperture.

32. A tube socket for use with a cathode ray tube of the type having a high voltage pin and a plurality of relatively low voltage pins, said socket comprising:

A. a first support having an area receiving a plurality of first terminals and a structure having a passage therethrough at least partially open at both ends;

B. a plurality of first terminals, adapted to make electrical connection to said low voltage pins, received on said first support at said area;

C. a member mounted on said structure and at least partially closing one end of said passage;

D. a first spark gap means located adjacent said one end of and exposed to the interior of said passage and connecting means electrically connected to said first spark gap means and extending to a point external of said structure;

E. a second support assembled with said first support and having a part registering with and at least partially closing the other end of said passage;

F. a second spark gap means located adjacent said other end of and exposed to the interior of said passage and spaced from said first spark gap means, and connecting means electrically connected to said second spark gap means and extending to a point external of said second support;

G. a second terminal, adapted to make electrical connection to said high voltage pin, mounted on said socket; and I. means electrically connecting said second terminal and said second spark gap means, in which said structure extends vertically from said first support, said member at least partially closes that end of said passage directed away from said second support, and said second support closes the other end of said passage, said first spark gap means is mounted on said member, said second spark gap means is mounted on said second support, said second terminal is mounted on said second support, said second spark gap means and said second terminal are integral with one another, and said structure has a plurality of passages of different axial lengths, each with its own set of spark gap means, said member at least partially closing one end of each of said passages and said second support part at least partially closing the other end of each of said passages, in which said one ends of said passages terminate at differently axially located points, and in which said member is stepped, whereby separate stepped parts thereof at least partially close said one ends of said passages respectively.

33. The tube socket of claim 32, in which the first spark gap means for each of said passages respectively are mounted on different stepped portions of said member.

34. The tube socket of claim 33, in which said first spark gap means for each of said passages respectively are integral with each other.

35. The tube socket of claim 32, in which said first spark gap means for each of said passages respectively are integral with each other.

36. A tube socket for use with a cathode ray tube of the type having a high voltage pin and a plurality of relatively low voltage pins, said socket comprising:

A. a first support having an area receiving a plurality of first terminals and a structure having a passage therethrough at least partially open at both ends;

B. a plurality of first terminals, adapted to make electrical connection to said low voltage pins, received on said first support at said area;

C. a member mounted on said structure and at least partially closing one end of said passage;

D. a first spark gap means located adjacent said one end of and exposed to the interior of said passage and connecting means electrically connected to said first spark gap means and extending to a point external of said structure;

E. a second support assembled with said first support and having a part registering with and at least partially closing the other end of said passage;

F. a second spark gap means located adjacent said other end of and exposed to the interior of said passage and spaced from said first spark gap means, and connecting means electrically connected to said second spark gap means and extending to a point external of said second support;

G. a second terminal, adapted to make electrical connection to said high voltage pin, mounted on said socket; and H. means electrically connecting said second terminal and said second spark gap means, in which said first spark gap means is mounted on said member, said second spark gap means is mounted on said second support, said second terminal is mounted on said second support, and said structure has a plurality of passages of different axial lengths, each with its own set of spark gap means, said member at least partially closing one end of each of said passages and said second support part at least partially closing the other end of each of said passages, in which said one ends of said passages terminate at differently axially located points, and in which said member is stepped, whereby separate stepped parts thereof at least partially close said one ends of said passages respectively.

37. The tube socket of claim 36, in which the first spark gap means for each of said passages respectively are mounted on different stepped portions of said member.

38. The tube socket of claim 37, in which said first spark gap means for each of said passages respectively are integral with each other.

39. The tube socket of claim 36, in which said first spark gap means for each of said passages respectively are integral with each other.

40. A tube socket for use with a cathode ray tube of the type having a high voltage pin and a plurality of relatively low voltage pins, said socket comprising:

A. a first support having an area receiving a plurality of first terminals and a structure having a passage therethrough at least partially open at both ends;

B. a plurality of first terminals, adapted to make electrical connection to said low voltage pins, received on said first support at said area;

C. a member mounted on said structure and at least partially closing one end of said passage;

D. a first spark gap means located adjacent said one end of and exposed to the interior of said passage and connecting means electrically connected to said first spark gap means and extending to a point external of said structure;

E. a second support assembled with said first support and having a part registering with and at least partially closing the other end of said passage;

F. a second spark gap means located adjacent said other end of and exposed to the interior of said passage and spaced from said first spark gap means, and connecting means electrically connected to said second spark gap means and extending to a point external of said second support;

G. a second terminal, adapted to make electrical connection to said high voltage pin, mounted on said socket; and H. means electrically connecting said second terminal and said second spark gap means, in which said structure has a plurality of passages of different axial lengths, each with its own set of spark gap means, said member at least partially closing one end of each of said passages and said second support part at least partially closing the other end of each of said passages, in which said one ends of said passages terminate at differently axially located points, and in which said member is stepped, whereby separate stepped parts thereof at least partially close said one ends of said passages respectively.

41. The tube socket of claim 40, in which the first spark gap means for each of said passages respectively are mounted on different stepped portions of said member.

42. The tube socket of claim 41, in which said first spark gap means for each of said passages respectively are integral with each other.

43. The tube socket of claim 40, in which said first spark gap means for each of said passages respectively are integral with each other.

44. A tube socket for use with a cathode ray tube of the type having a high voltage pin and a plurality of relatively low voltage pins, said socket comprising:

A. a first support having an area receiving a plurality of first terminals and a structure having a passage therethrough at least partially open at both ends;

B. a plurality of first terminals, adapted to make electrical connection to said low voltage pins, received on said first support at said area;

C. a member mounted on said structure and at least partially closing one end of said passage;

D. a first spark gap means located adjacent said one end of and exposed to the interior of said passage and connecting means electrically connected to said first spark gap means and extending to a point external of said structure;

E. a second support assembled with said first support and having a part registering with and at least partially closing the other end of said passage;

F. a second spark gap means located adjacent said other end of and exposed to the interior of said passage and spaced from said first spark gap means, and connecting means electrically connected to said second spark gap means and extending to a point external of said second support;

G. a second terminal, adapted to make electrical connection to said high voltage pin, mounted on said socket; and H. means electrically connecting said second terminal and said second spark gap means, in which said passage has a radial passage extension open at an end of said passage, and one of said member and said second support part having an aperture registering with said radial passage extension.

45. The tube socket of claim 44, in which said radial passage extension is open at said one end of said passage and said member is provided with said aperture.

46. The tube socket of claim 44, in which said structure extends vertically from said first support, said member at least partially closes that end of said passage directed away from said second support, and said second support closes the other end of said passage.

47. The tube socket of claim 46, in which said radial passage extension is open at said one end of said passage and said member is provided with said aperture.

* * * * *